United States Patent [19]

Bunker

[11] Patent Number: 5,611,197
[45] Date of Patent: Mar. 18, 1997

[54] CLOSED-CIRCUIT AIR COOLED TURBINE

[75] Inventor: Ronald S. Bunker, Niskayuna, N.Y.

[73] Assignee: General Electric Company, Schenectady, N.Y.

[21] Appl. No.: 551,870

[22] Filed: Oct. 23, 1995

[51] Int. Cl.$^6$ ..................................................... F02C 7/18
[52] U.S. Cl. ........................................ 60/39.75; 415/115
[58] Field of Search ............................... 60/39.07, 39.75, 60/266; 415/115, 117

[56] References Cited

U.S. PATENT DOCUMENTS

| | | | |
|---|---|---|---|
| 2,618,120 | 11/1952 | Papini | 60/39.75 |
| 3,751,909 | 8/1973 | Kohler | 415/115 |
| 5,134,844 | 8/1992 | Lee et al. | 60/39.75 |

OTHER PUBLICATIONS

"Effects of Closed–Circuit Gas Turbine Cooling Systems on Combined Cycle Performance", by Ikeguchi et al., ASME 94-JPGC-GT-8, Oct. 2-Jun. 1994, pp. 1-7.

"A Combined Cycle Design to Achieve Greater than 60 percent Efficiency", by Briesch et al., IGTI-vol. 9, ASME Cogen-Turbo, Aug. 1994, pp. 299-308.

"Design 60% Net Efficiency in Frame 7/9H Steam–Cooled CCGT", by Farmer et al., Gas Turbine World, vol. 26, No. 3, May-Jun. 1995, pp. Cover, 1, 12-14, 16, 18, 20.

"Power Systems for the 21st Century H Gas Turbine Combined Cycles", by Corman et al., ASME/IGTI Expo 1995, Jun. 1995, pp. Cover, back, and 1-12.

*Primary Examiner*—Louis J. Casaregola
*Attorney, Agent, or Firm*—Marvin Snyder

[57] ABSTRACT

A gas turbine engine includes a compressor, combustor, and turbine, and a cooling air closed-circuit having an extraction line from the compressor to a hot turbine component such as vanes, blades, or shrouds, and a return line to the compressor. The extraction line may be joined to any suitable compressor stage for extracting air at a suitable pressure for flow to the turbine, with the return line being joined to any suitable injection stage of the compressor having a lower pressure than the extraction stage for driving the cooling air through the closed-circuit. The compressor itself therefore drives the closed-circuit and is self regulated.

4 Claims, 1 Drawing Sheet

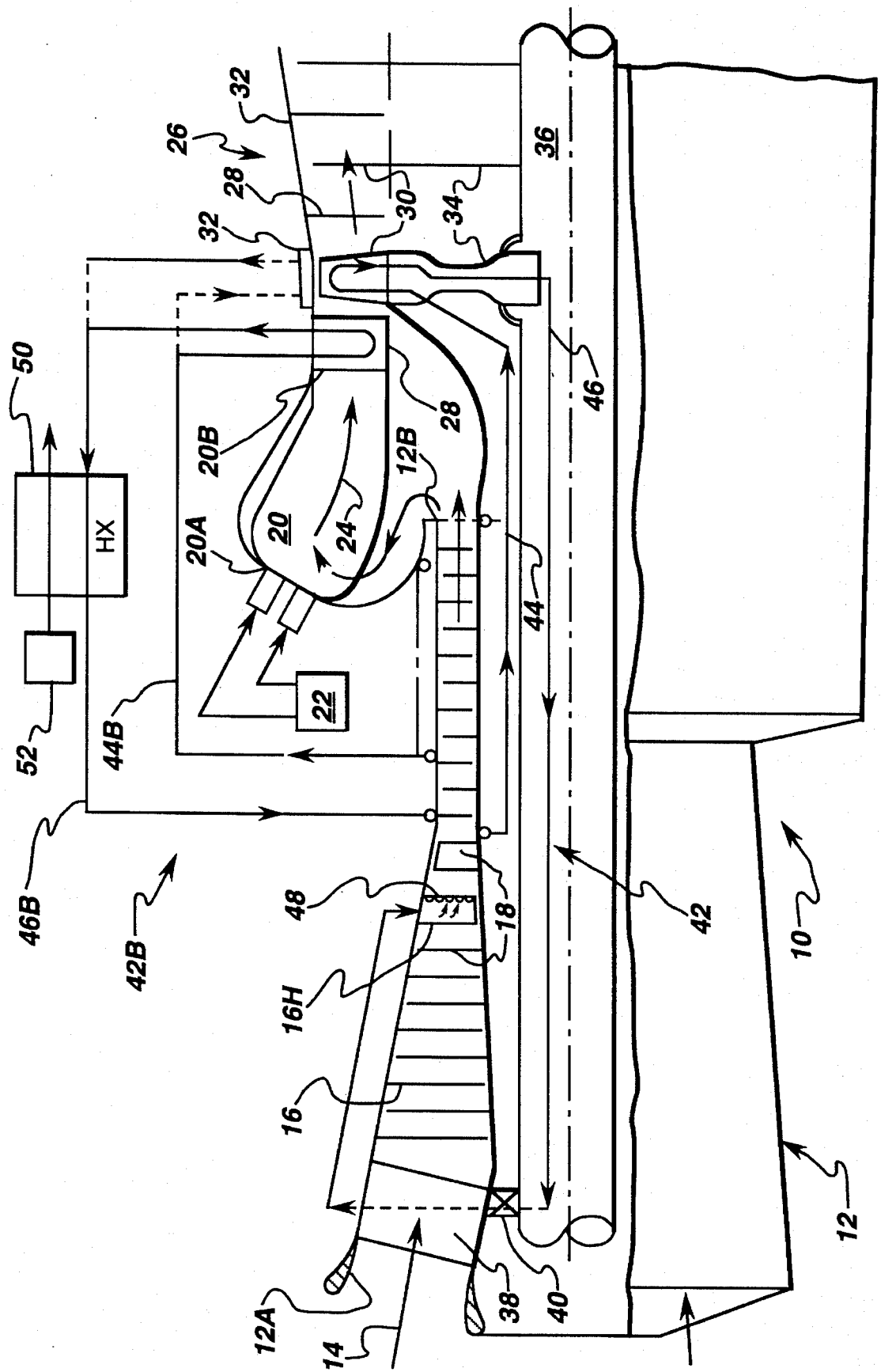

5,611,197

CLOSED-CIRCUIT AIR COOLED TURBINE

BACKGROUND OF THE INVENTION

The present invention relates generally to gas turbine engines, and, more specifically, to air cooling of hot components therein such as turbine vanes, blades, and shrouds.

A gas turbine engine includes a compressor for compressing air which is suitably mixed with fuel and ignited for generating combustion gases in a combustor disposed in flow communication with a turbine which extracts energy therefrom for powering the compressor and producing output power such as that used for powering an electrical generator. The turbine includes one or more stages of stator nozzles or vanes, rotor blades, and annular shrouds around the turbine blades for maintaining suitably tight clearances therewith.

The turbine vanes, blades, and shrouds are heated by the hot combustion gases and are typically cooled during operation to ensure a useful life thereof. Cooling is typically accomplished by bleeding a portion of the compressed air from the compressor and suitably channeling it through various conventional local circuits in these components for providing cooling thereof. These turbine components typically include conventional film cooling holes therethrough which discharge the cooling air in a boundary layer film for protecting the components from the hot combustion gases. The cooling air mixes with the combustion gases in the turbine and reduces engine efficiency due to thermodynamic and aerodynamic reasons. Furthermore, any compressed air bled from the compressor and not used in generating the combustion gases in the first instance also necessarily reduces efficiency of the engine, and therefore, it is desirable to minimize the amount of cooling air bled from the compressor.

Turbine efficiency increases as the turbine inlet temperature increases but the increasing temperature also requires more effective cooling of the heated components. The art is crowded with various techniques for locally cooling turbine vanes, blades, and shrouds for maximizing cooling effectiveness with a minimum amount of cooling air.

Air cooling circuits of typical gas turbine engines are open-circuits since the cooling air is bled from the compressor and reintroduced into the turbine after cooling the hot components thereof. Closed-circuit cooling of gas turbine engines is known in the literature and is typically combined with steam turbines in a combined cycle power plant. Steam from the steam turbine is used in a closed-circuit through the hot gas turbine components for cooling thereof without the use of film cooling holes which would reintroduce the fluid into the gas turbine. However, a steam turbine is necessary for producing the cooling steam for the gas turbine engine, and, steam has different heat transfer capabilities than simple air.

In another closed-circuit cooling arrangement for a gas turbine engine, compressor discharge air is extracted from a plenum surrounding the combustor, precooled in a suitable heat exchanger, and then further compressed in a booster compressor to provide the required driving pressure to channel the cooling air through a closed-circuit in turbine blades, with the spent cooling air being returned to the combustor plenum. Significant advantages accrue due to closed-circuit air cooling since the air is not discharged into the turbine through film cooling holes and therefore the associated thermodynamic and aerodynamic losses are eliminated. However, this arrangement is relatively complex and requires the auxiliary booster compressor for being implemented.

SUMMARY OF THE INVENTION

A gas turbine engine includes a compressor, combustor, and turbine, and a cooling air closed-circuit having an extraction line from the compressor to a hot turbine component such as vanes, blades, or shrouds, and a return line to the compressor. The extraction line may be joined to any suitable compressor stage for extracting air at a suitable pressure for flow to the turbine, with the return line being joined to any suitable injection stage of the compressor having a lower pressure than the extraction stage for driving the cooling air through the closed-circuit. The compressor itself therefore drives the closed-circuit and is self regulated.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawing in which the sole FIGURE is a schematic representation of an exemplary industrial or power generation gas turbine engine having a cooling air closed-circuit in accordance with several embodiments of the present invention.

DESCRIPTION OF THE PREFERRED EMBODIMENT(S)

Illustrated schematically in FIG. 1 is an exemplary industrial or power generation gas turbine engine 10 used for powering an electrical generator (not shown) for an electrical utility power grid. The engine 10 includes a compressor 12 having an annular inlet 12a for receiving and compressing air 14 which is discharged from an annular outlet 12b of the compressor at maximum pressure. The compressor 12 is an axial compressor having alternating rows of stator vanes 16 and rotor blades 18 arranged in a plurality of stages for sequentially compressing the air 14, with each succeeding, downstream stage increasing the pressure higher and higher until the air is discharged from the compressor outlet 12b at maximum pressure.

A conventional combustor 20 has an inlet 20a disposed in flow communication with the compressor outlet 12b for receiving the compressed outlet air therefrom. Conventional fuel supplying means 22, including a suitable fuel supply, conduits and fuel injectors, are provided for mixing a suitable fuel, such as natural gas, with the compressed outlet air for undergoing combustion in the combustor 20 and generating hot combustion gases 24 therein. In the exemplary embodiment illustrated in the FIGURE the combustor is a low Nox combustor including a plurality of circumferentially adjoining burner cans each of which includes one or more conventional premixers at the combustor inlet 20a for premixing the fuel and air and prevaporizing the fuel prior to introduction into the combustor 20 wherein it is burned with relatively low NOx emissions.

Disposed downstream from the combustor 20 in flow communication therewith is a turbine 26 which receives the combustion gases 24 and extracts energy therefrom in a conventional manner. The turbine 26 has various components that are heated by the combustion gases 24 including respective rows of stator nozzles or vanes 28 and rotor blades 30 arranged in at least one stage, with three exemplary stages being illustrated schematically in the FIGURE.

The turbine blades 30 of each row are disposed radially inwardly within an annular stator shroud 32 to define a relatively small tip clearance therebetween for maintaining efficiency of the engine. The turbine blades 30 of each row extend radially outwardly from a conventional rotor disk 34, with the disk 34 being conventionally fixedly joined to the compressor 12 by a rotor shaft 36. The rotor shaft 36 is conventionally supported through various frames such as a front frame 38 by suitable bearings 40. During operation, the turbine blades 30 extract energy from the combustion gases 24 for rotating the rotor disk 34 and in turn the compressor 12. The turbine 26 powers both the compressor 12 and an external load such as the electrical generator (not shown).

In accordance with the present invention, a cooling air closed-circuit 42 is provided for cooling any of the hot components of the turbine 26 using a portion of the compressed air 14 bled from the compressor 12 which is returned thereto after cooling the turbine, and is therefore not discharged into the combustion gases 24 through conventional film cooling holes for example. In this way, the attendant thermodynamic and aerodynamic losses associated with an open-circuit cooling system which discharges air through film cooling holes are eliminated. And, the compressor 12 itself is used as the motive force for powering the circuit 42 and therefore does not require a dedicated auxiliary compressor for this purpose and the attendant complexity thereof.

More specifically, the cooling circuit 42 illustrated in the FIGURE includes an extraction conduit or line 44 conventionally disposed in flow communication from an extraction point or stage of the compressor 12 for bleeding therefrom a portion of the compressed air 14 as cooling or bleed air at a corresponding extraction pressure. The extraction line 44 extends to any desired one of the heated components of the turbine 26 requiring cooling such as the turbine vanes 28, blades 30, and shrouds 32 for undergoing conventional internal cooling thereof. The circuit 42 also includes a return conduit or line 46 for returning spent cooling air warmed by its passage through the turbine components to the compressor 12 at a suitable injection point or stage disposed upstream of the extraction stage. The extraction stage has a greater pressure than that of the injection stage for driving the cooling air through the circuit 42 and returning the spent cooling air into the compressor 12 to rejoin the compressed air 14 flowing therethrough. This simple cooling circuit 42 is self-powered by the available differential pressures in corresponding stages of the compressor 12, and is also self-regulated since the turbine cooling requirements vary at the various loads of operation of the engine 10. Self or automatic regulation of flow through the cooling circuit 42 may be therefore obtained without the use of additional regulation valves therefor.

Furthermore, the extraction and injection stages of the compressor 12 may be specifically selected during the design process to minimize differential pressure between the spent cooling air injected into the compressor 12 at the injection stage and the compressed air flowing therethrough. The pressure of the injected cooling air must be suitably larger than the pressure of the compressed air 14 at the injection stage to ensure positive forward flow through the cooling circuit 42. However the differential pressure should be minimized, with the injection stage vanes and blades being suitably sized and configured for maintaining a predetermined stall margin of the compressor 12. Compressor bleeding for extracting air for cooling hot turbine components is well known and may be used for effecting the extraction line 44 to the hot turbine components. However, injection of the returning spent cooling air into the compressor 12 is a new feature, with the compressor 12 being suitably designed for accommodating the returning flow while maintaining acceptable performance and stall margin.

For example, the returning air may be injected into the compressor 12 through a row of hollow compressor vanes 16h specifically configured to have a row of trailing edge holes 48 disposed in flow communication with the return line 46 for injecting the spent cooling air along the entire radial span of the vanes 16h into the compressed air 14 flowing through the compressor 12.

Each of the turbine vanes 28, blades 30, and shrouds 32 may be separately joined to the cooling circuit 42 as desired, with each being hollow and including at least one local cooling circuit therein which is otherwise conventional except for the elimination of film cooling holes joined thereto for preventing discharge of the cooling air directly into the flowpath of the turbine 26. Hot turbine components typically include one or more passages which are either straight or serpentine, with various forms of heat transfer turbulators and ribs therein which may also be used in the present invention. Any one or all of local circuits typically found in the hot turbine components may be joined into the closed-circuit 42 for return of the spent cooling air to the compressor 12. If desired, the turbine components may include both conventional open-circuit local cooling circuits, and another local circuit joined into the closed-circuit 42. Accordingly, the cooling circuit 42 may be joined to the turbine vanes 28; or the turbine blades 30; or the turbine shrouds 32, or any combinations thereof if desired.

In one exemplary embodiment of the cooling circuit 42, the first stage rotor blades 30 are joined in a closed loop with the compressor 12, and therefore, the conventional blade inducer which is typically in the form of a plurality of side ribs attached to the rotor disk 34 may be used for additionally pressurizing the cooling air channeled through the extraction line 44 to the blades 30. This would reduce the required driving pressure from the compressor 12, and a lower-pressure extraction stage therein may be used. Or, the extraction line 44 may be joined directly to the compressor outlet 12b as shown in phantom in the FIGURE for receiving maximum pressure air therefrom if desired.

Because cooling is effected in the closed-circuit 42 without film cooling, the amount of cooling air required will typically be greater depending on the temperature of the extracted compressor air. Without film cooling, the requirement to meet conventional backflow margin for the turbine blades 30 is eliminated. Accordingly, the pressure level of the cooling air is primarily chosen from the required heat transfer for cooling of the selected turbine component. This may be accomplished with compressor air at various pressure levels selected from the different stages of the compressor 12 to provide a suitably high pressure for this purpose. Typical trade-offs may be made between pressure, temperature, and mass flowrate to accomplish effective cooling in the closed-circuit 42.

Illustrated also in the FIGURE is another cooling air closed-circuit designated 42B which is specifically configured for extracting cooling air from the compressor 12 for flow through the first stage turbine nozzle or vanes 28 using a corresponding extraction line 44B and return line 46B. In the first stage turbine nozzle 28, the correspondingly high requirement for effective cooling may also, or instead, require the use of conventional film cooling holes supplied by compressor discharge air from the outlet 12b through a dedicated passage in the nozzle.

Since the turbine vanes 28 are stationary components, the extraction and return lines 44B, 46B are more readily routed between the compressor 12 and the vanes 28 around the circumference of the turbine. For the cooling circuit 42 illustrated in the FIGURE dedicated to cooling the first stage turbine blades 30, the extraction and return lines 44, 46 are suitably routed radially within the compressor and turbine, with the return line 46 being suitably channeled through a stationary component such as the front frame 38 for return to the corresponding injection stage.

As indicated above the spent cooling air is not discharged into the hot combustion gases 24 flowing through the turbine 26 avoiding the attendant thermodynamic and aerodynamic mixing losses. Accordingly, the energy developed in compressing the bleed air used for cooling the turbine components is retained within the engine core and reintroduced into the compressor 12 for undergoing further work and combustion in the overall cycle. The cooling air is heated when it cools the hot turbine components, with the energy increase in the cooling air correspondingly increasing the compressor discharge temperature. The increased compressor discharge temperature may be used to advantage in the combustor 20. If desired, however, the heated cooling air being returned through the return lines 46, 46B may be also used to advantage for preheating the fuel supplied to the combustor 20 for example. Yet further, a conventional heat exchanger (HX) 50 may be disposed in flow communication in the return line 46B for reducing the temperature of the returning cooling air prior to injection into the compressor 12. Conventional means 52 are provided for channeling a suitable cooling fluid through the heat exchanger 50 for cooling the spent cooling air returning from the hot turbine components prior to its return to the compressor 12. The cooling means 52 may include suitable conduits for channeling the relatively cool fuel through the heat exchanger 50 as a heat sink for cooling the returning air. Alternatively, the cooling means 52 may channel air at a cooler temperature than that of the returning spent air from the hot turbine components in an air-to-air heat exchanger if desired. The heat exchanger 50 may be sized and configured so that the spent cooling air injected into the compressor 12 matches in temperature the compressed air 14 flowing therethrough at the injection stage.

The FIGURE also illustrates in phantom that the cooling circuit 42B may receive compressor discharge air from the compressor outlet 12b at maximum pressure if desired. And, also shown in phantom, are alternate paths for the cooling circuit 42B joined to the turbine shroud 32 surrounding the first stage rotor blades 30.

The closed-circuit cooling arrangements described above are more practical for introduction in land-based industrial gas turbine engines which are typically substantially larger than their aircraft gas turbine engine counterparts. Power generation turbines are typically operated at specific load points either for base load or peaking load demands, and therefore the operating range is more limited. Accordingly, the compressor 12 may be more easily designed for extracting and reinjecting the cooling air with appropriate changes thereof while allowing operation with suitable compressor performance and stall margin.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A gas turbine engine comprising:

a compressor having an inlet for receiving air, stator vanes and rotor blades arranged in a plurality of stages for sequentially compressing said air, and an outlet for discharging said compressed air at maximum pressure;

a combustor disposed in flow communication with said compressor outlet for receiving said compressed outlet air;

means for mixing fuel with said compressed outlet air for undergoing combustion in said combustor and generating combustion gases therein;

a turbine disposed in flow communication with said combustor for receiving said combustion gases, and including stator vanes and rotor blades arranged in at least one stage for expanding said combustion gases to extract energy therefrom, said turbine blades being disposed radially within an annular shroud and extending radially outwardly from a rotor disk, said rotor disk being fixedly joined to said compressor;

a cooling air closed-circuit having an extraction line disposed in flow communication from an extraction stage of said compressor, for bleeding therefrom air at an extraction pressure, to a cooled component including one of said turbine vanes, blades, and shroud for internal cooling thereof, and having also a return line for returning spent cooling air from said cooled component to an injection stage of said compressor disposed upstream of said extraction stage, with said extraction stage having a greater pressure than that of said injection stage for driving said cooling air through said circuit and returning said spent cooling air into said compressor to rejoin said compressed air flowable therethrough;

said cooled component joined to said cooling circuit is hollow and includes at least one local cooling circuit without film cooling holes joined thereto for preventing discharge of said cooling air directly into said turbine;

a heat exchanger disposed in flow communication with said return line; and means for channeling a cooling fluid through said heat exchanger for cooling said spent cooling air prior to return to said compressor.

2. An engine according to claim 1 wherein said heat exchanger is sized and configured so that said spent cooling air injected into said compressor matches in temperature said compressed air flowable therethrough at said injection stage.

3. A gas turbine engine comprising:

a compressor having an inlet for receiving air, stator vanes and rotor blades arranged in a plurality of stages for sequentially compressing said air, and an outlet for discharging said compressed air at maximum pressure;

a combustor disposed in flow communication with said compressor outlet for receiving said compressed outlet air;

means for mixing fuel with said compressed outlet air for undergoing combustion in said combustor and generating combustion gases therein;

a turbine disposed in flow communication with said combustor for receiving said combustion gases, and including stator vanes and rotor blades arranged in at least one stage for expanding said combustion gases to extract energy therefrom, said turbine blades being disposed radially within an annular shroud and extending radially outwardly from a rotor disk, said rotor disk being fixedly joined to said compressor;

a cooling air closed-circuit having an extraction line disposed in flow communication from an extraction stage of said compressor, for bleeding therefrom air at an extraction pressure, to a cooled component including one of said turbine vanes, blades, and shroud for internal cooling thereof, and having also a return line for returning spent cooling air from said cooled component to an injection stage of said compressor disposed upstream of said extraction stage, with said extraction stage having a greater pressure than that of said injection stage for driving said cooling air through said circuit and returning said spent cooling air into said compressor to rejoin said compressed air flowable therethrough;

said cooled component joined to said cooling circuit is hollow and includes at least one local cooling circuit without film cooling holes joined thereto for preventing discharge of said cooling air directly into said turbine; and said cooling circuit is joined to said turbine blades.

4. A gas turbine engine comprising:

a compressor having an inlet for receiving air, stator vanes and rotor blades arranged in a plurality of stages for sequentially compressing said air, and an outlet for discharging said compressed air at maximum pressure;

a combustor disposed in flow communication with said compressor outlet for receiving said compressed outlet air;

means for mixing fuel with said compressed outlet air for undergoing combustion in said combustor and generating combustion gases therein;

a turbine disposed in flow communication with said combustor for receiving said combustion gases, and including stator vanes and rotor blades arranged in at least one stage for expanding said combustion gases to extract energy therefrom, said turbine blades being disposed radially within an annular shroud and extending radially outwardly from a rotor disk, said rotor disk being fixedly joined to said compressor;

a cooling air closed-circuit having an extraction line disposed in flow communication from an extraction stage of said compressor, for bleeding therefrom air at an extraction pressure, to a cooled component including one of said turbine vanes, blades, and shroud for internal cooling thereof, and having also a return line for returning spent cooling air from said cooled component to an injection stage of said compressor disposed upstream of said extraction stage, with said extraction stage having a greater pressure than that of said injection stage for driving said cooling air through said circuit and returning said spent cooling air into said compressor to rejoin said compressed air flowable therethrough.

said cooled component joined to said cooling circuit is hollow and includes at least one local cooling circuit without film cooling holes joined thereto for preventing discharge of said cooling air directly into said turbine; and said cooling circuit is joined to said turbine shroud.

* * * * *